United States Patent
Park et al.

(10) Patent No.: US 6,317,254 B1
(45) Date of Patent: Nov. 13, 2001

(54) PARALLEL OPTICAL FIBER AMPLIFIER WITH HIGH POWER CONVERSION

(75) Inventors: Nam-Kyoo Park, Seoul; Ju-Han Lee, Suwon-shi; Uh-Chan Ryu, Seoul, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/449,691

(22) Filed: Nov. 24, 1999

(30) Foreign Application Priority Data

Nov. 24, 1998 (KR) .............................. 1998/50407

(51) Int. Cl.[7] ................................................ H01S 3/09
(52) U.S. Cl. .................................................. 359/341
(58) Field of Search .................... 359/337, 341, 359/345; 372/4

(56) References Cited

U.S. PATENT DOCUMENTS

| | | | |
|---|---|---|---|
| 5,859,725 | * | 1/1999 | Sugiya et al. ............... 359/341 |
| 5,978,130 | * | 11/1999 | Fee et al. .................... 359/341 |
| 6,049,417 | * | 4/2000 | Srivastava et al. .......... 359/341 |
| 6,049,418 | * | 4/2000 | Srivastava et al. .......... 359/341 |
| 6,091,743 | * | 7/2000 | Yang ............................ 372/6 |
| 6,104,527 | * | 8/2000 | Yang ............................ 359/341 |

OTHER PUBLICATIONS

Park et al., 'Efficient and low–noise operation in a gain-flattened 1580nm band /EDFA', OFC/IOOC '99 Technical Digest, Feb. 21–26, 1999, pp. 123–125.*

Lee et al., 'Improvement of 1.57—1.61 micrometer Band Amplification Efficiency by Recycling Wasted backward ASE through the Unpumped EDF Section'.*

* cited by examiner

Primary Examiner—Thomas H. Tarcza
Assistant Examiner—Deandra M. Hughes
(74) Attorney, Agent, or Firm—Steve Cha; Klauber & Jackson

(57) ABSTRACT

A parallel optical fiber amplifier having a configuration in which a C-band silica-based erbium-doped fiber amplifier (EDFA) stage and an L-band EDFA stage are coupled together in parallel in such a fashion that a reverse amplified spontaneous emission (ASE) light emitted from the C-band and/or L-band EDFA stage is reused as a secondary pumping source for an amplification in the L-band EDFA stage. In the optical fiber amplifier of the present invention, the reverse ASE light emitted from the C-band EDFA stage and the reverse ASE light emitted from the L-band EDFA stages supplied to the L-band EDFA stage so that they can be reused for improving the power conversion efficiency of the entire system and for reducing the noise factor thereof.

18 Claims, 6 Drawing Sheets

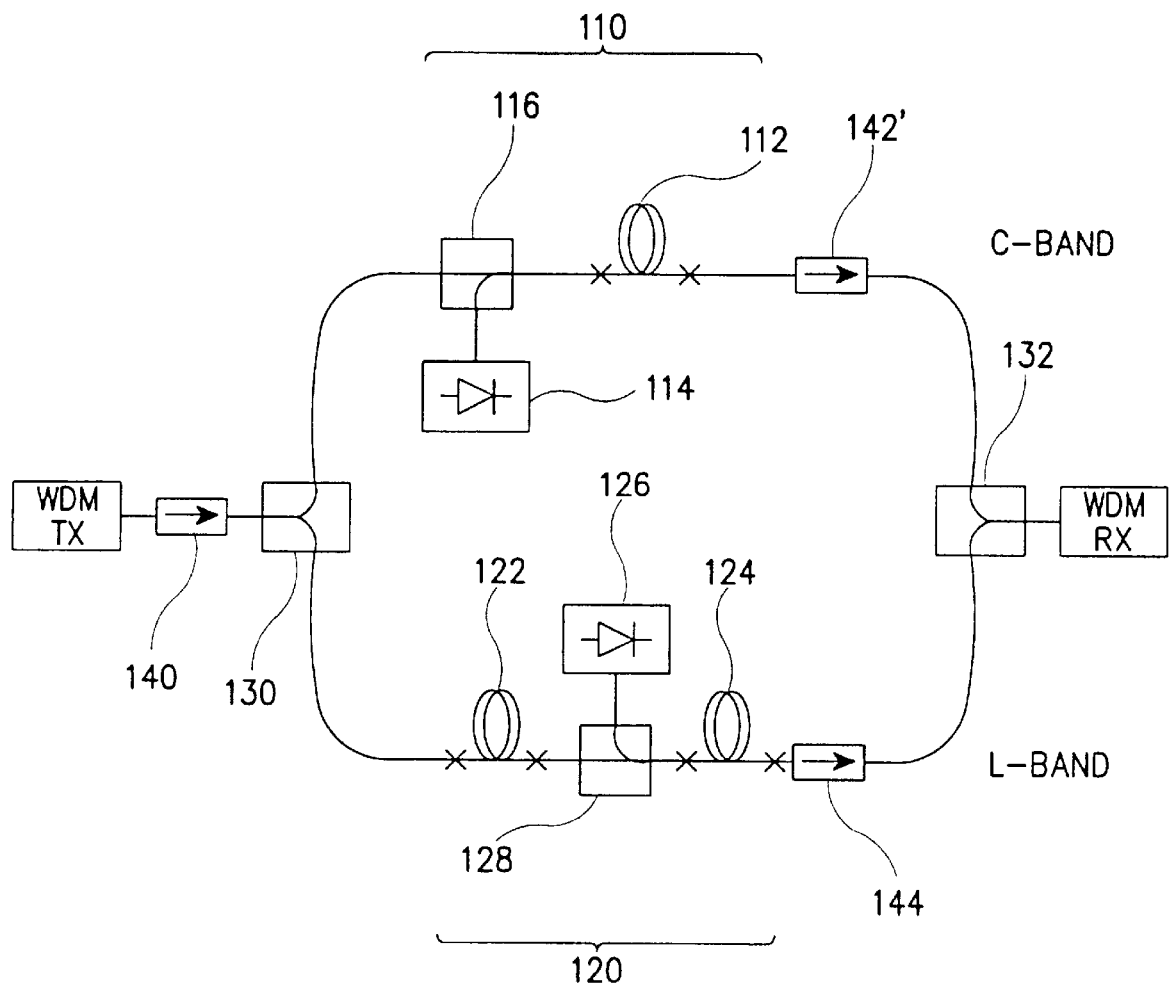
FIG. 1A [PRIOR ART]

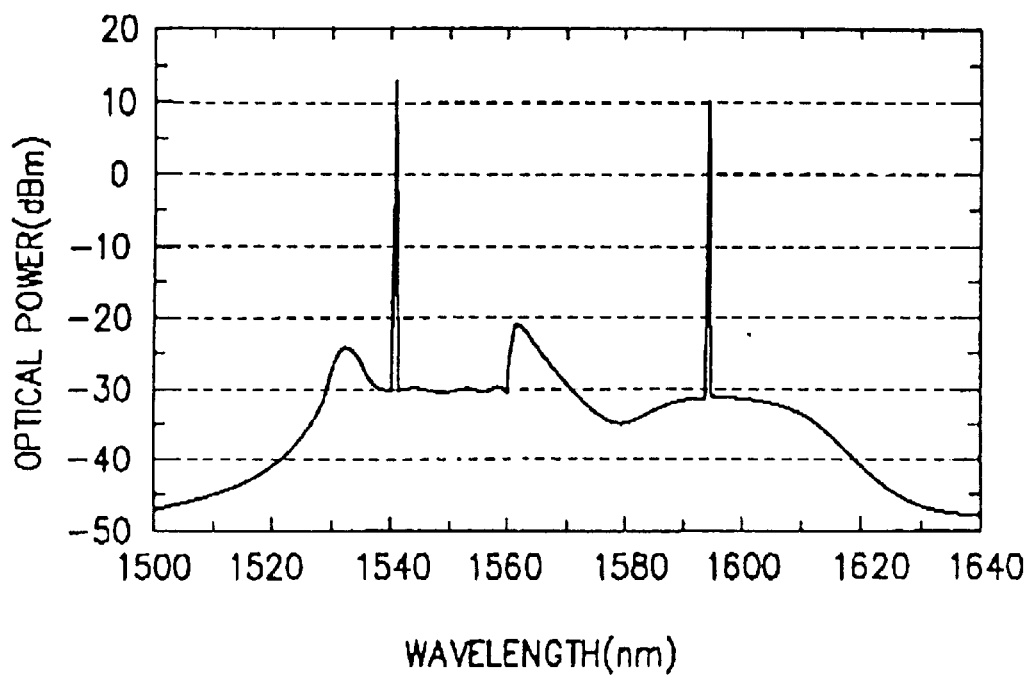
FIG. 2 [PRIOR ART]

PARALLEL OPTICAL FIBER AMPLIFIER WITH HIGH POWER CONVERSION

CLAIM OF PRIORITY

This application makes reference to, incorporates the same herein, and claims all benefits accruing under 35 U.S.C. § 119 arising from an application entitled, PARALLEL OPTICAL FIBER AMPLIFIER WITH HIGH POWER CONVERSION, filed earlier in the Korean Industrial Property Office on Nov. 24, 1998, and there duly assigned Ser. No. 1998-50407.

BACKGROUND OF THE INVENTION

1. Field of the Invention

The present invention relates to an optical device for optical communications, and more particularly to a parallel optical fiber amplifier having a configuration capable of reusing an amplified spontaneous emission (ASE) light as a secondary pumping source.

2. Description of the Related Art

Currently, $Er^{3+}$-doped fiber amplifiers (EDFAs) having a wide gain band have been proposed to increase the capability of wavelength division multiplexed (WDM) systems to meet the continued demand for higher capacity. For the practical systems using such EDFAs, it has been regarded as inevitably necessary to use silica-based EDFAs of a typical C-band (a wavelength band of 1,530 to 1,560 nm) and/or an L-band of long wavelengths (a wavelength of 1,570 to 1610 nm) coupled together in parallel, in spite of the fact that optical fiber amplifiers made of new materials such as tellurite-based EDFAs have been developed.

In association with L-band EDFAs, there are many pending problems to be solved due to a short history in the development of L-band EDFAs. For example, L-band EDFAs have low power conversion efficiency and thus require high-power pumps. Due to such low pumping efficiency of L-band EDFAs, the silica-based optical fiber amplifiers with an L-band EDFA in a parallel configuration have a limitation in its application in the wide bands. In order to improve the power conversion efficiency of L-band EDFAs, the present inventors have developed a technique for reusing the useless amplified spontaneous emission (ASE) light as a secondary pumping source in an EDF region, which is not being pumped by a light source. In accordance with this technique, a considerable improvement in performance is exhibited. This technique is disclosed in Korean Patent Application No. 98-34370.

In association with the reuse of obsolete reverse ASE light, the present inventors have devised a technique for reusing the reverse ASE light, generated in a C-band EDFA, for amplification at L-band EDFA stage, which is applicable to wide-band silica-based optical fiber amplifiers having a parallel connection configuration.

SUMMARY OF THE INVENTION

Therefore, an object of the invention is to provide an optical fiber amplifier that exhibits high power conversion efficiency in wide wavelength bands.

In accordance with the present invention, this object can be accomplished by providing a parallel optical fiber amplifier comprising a first EDFA stage and a second EDFA stage connected to the first EDFA stage in parallel, the second EDFA stage having a gain wavelength band different from that of the first EDFA stage, and the means for reusing spontaneous emission light emitted from the first EDFA stage as a secondary pumping source for the second EDFA stage.

The first EDFA stage includes a C-band EDFA, and the second EDFA stage includes an L-band EDFA. Accordingly, it is possible to embody a parallel optical fiber amplifier capable of exhibiting a high power conversion efficiency at relatively wide wavelength bands.

The reusing means includes a circulator for receiving the spontaneous emission light from the first EDFA stage, a connecting optical fiber for transmitting the received spontaneous emission light to the second EDFA stage, and a wavelength selective coupler connected between the connecting optical fiber and the second EDFA stage in such a fashion that the spontaneous emission light from the connecting optical fiber is transmitted to the second EDFA stage.

The second EDFA stage includes optical pumping means, a first optical fiber portion adapted to be optically pumped by the optical pumping means, and a second optical fiber portion not being pumped by the optical pumping means. The optical pumping means of the second EDFA stage is disposed between the first and second optical fiber portions and performs a forward pumping operation to the first optical fiber portion. Accordingly, a more efficient optical amplification for the second EDFA stage can be achieved because the second EDFA stage is supplied with the useless reverse ASE light from its first optical fiber portion as well as the useless reverse ASE light from the first EDFA stage, which are then used as a secondary pumping source.

In each of the above mentioned cases, the first and second EDFA stages are preferably comprised of a silica-based optical fiber.

A BRIEF DESCRIPTION OF THE DRAWINGS

The foregoing and other and further objects, features, and advantages of the present invention will become more apparent from the following detailed description when taken in conjunction with the accompanying drawings in which:

FIG. 1a is a schematic view illustrating a general parallel optical fiber amplifier;

FIG. 2 is a graph depicting an optical output spectrum of the general parallel optical fiber amplifier shown in FIG. 1a, except without the EDF portion not being pumped by the source, for a saturated input signal of 0 dBm.

Figure 1B:
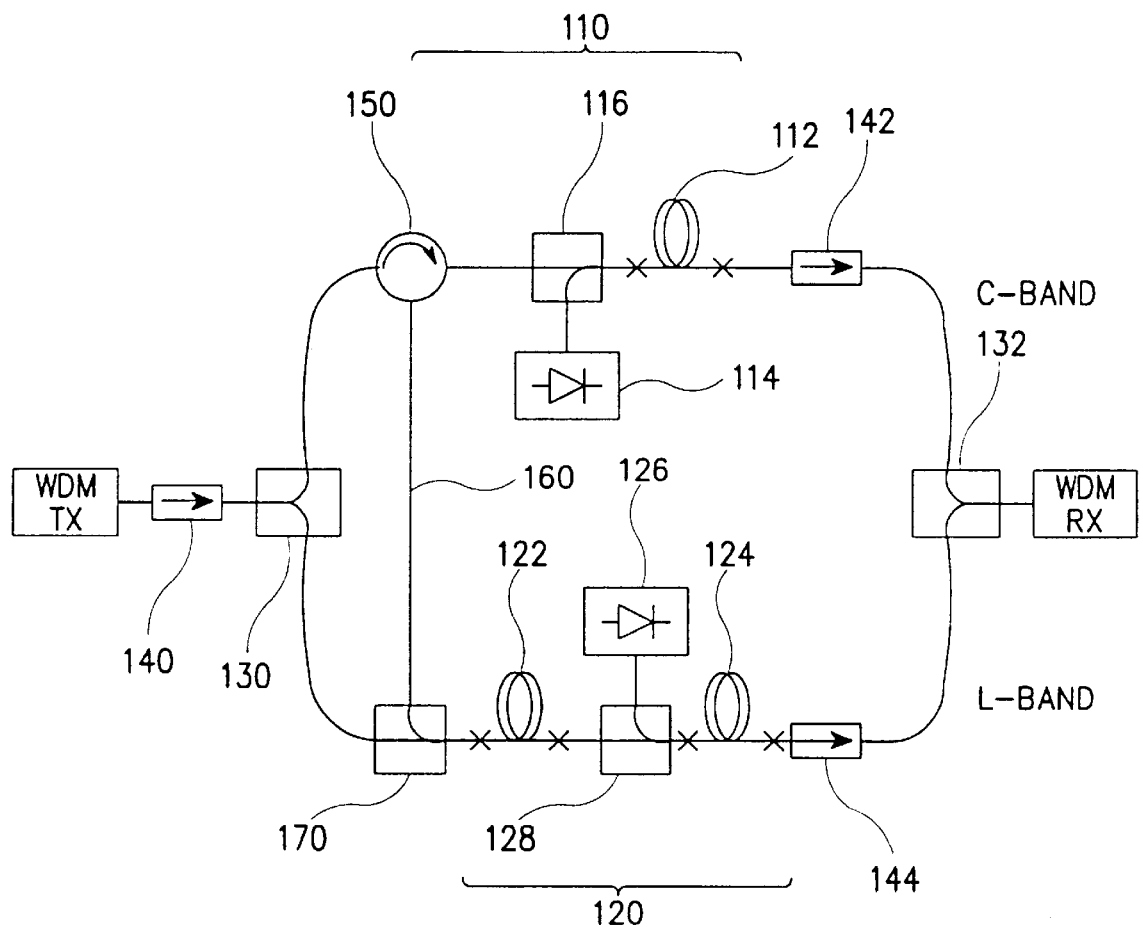
FIG. 1b is a schematic view illustrating a parallel optical fiber amplifier according to an embodiment of the present invention.
Figure 4A:
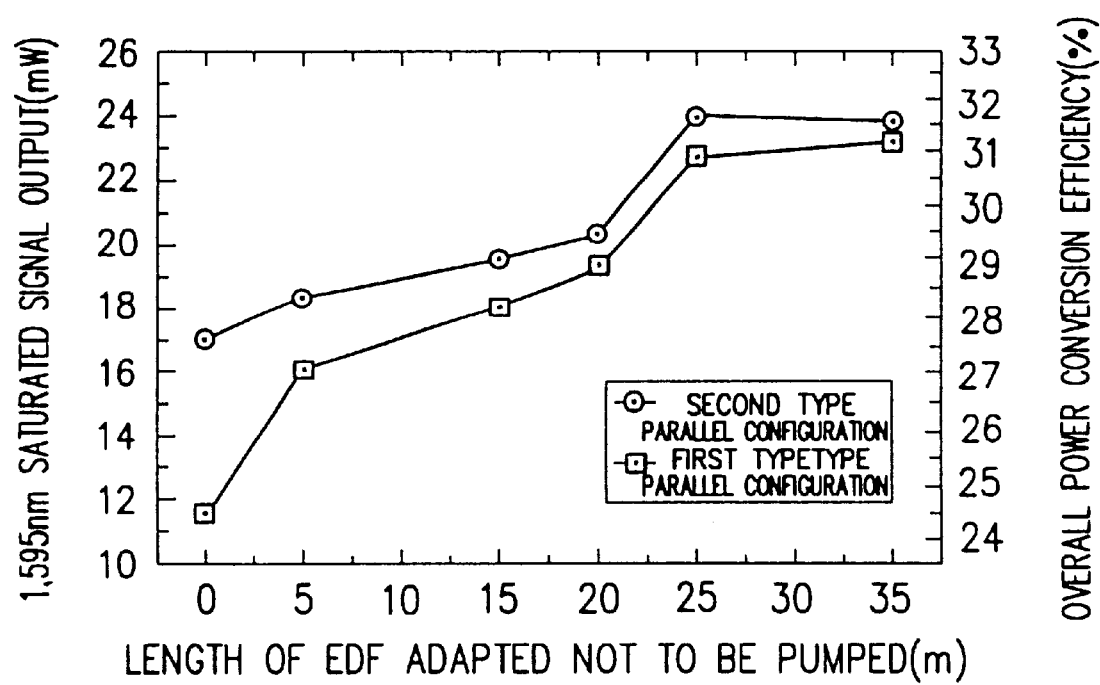
Figure 4B:
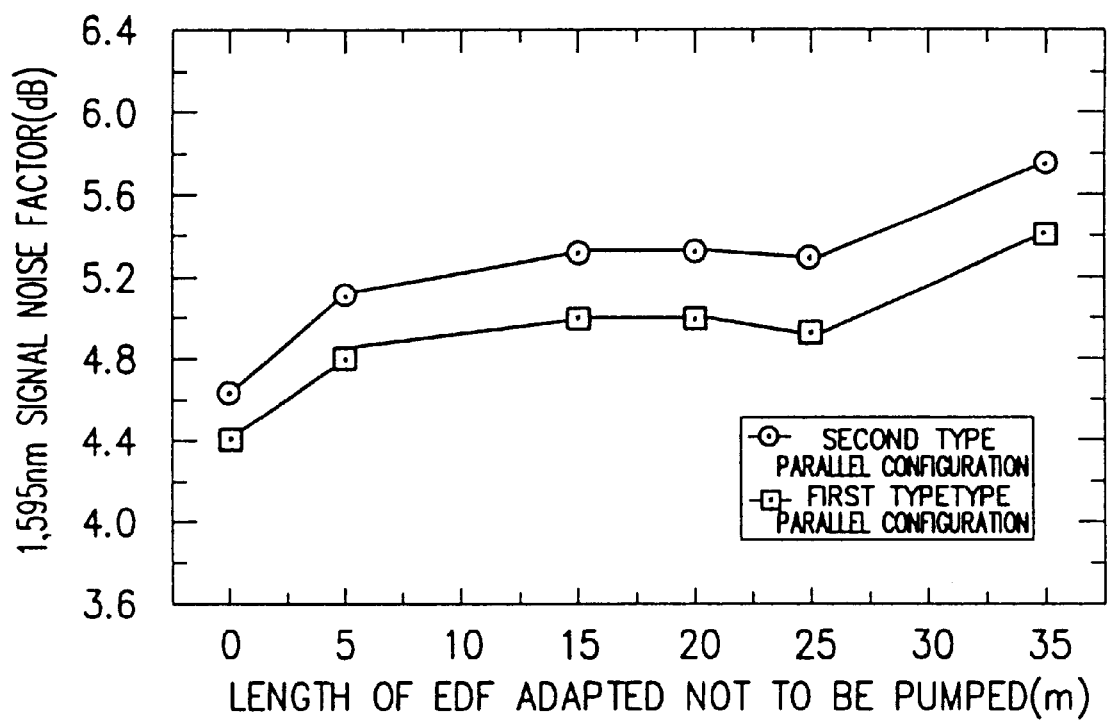

FIG. 4a is a graph depicting the measurement results for the 1,595 nm saturated signal output intensity (along with the 1.540 nm saturated signal output intensity) and the power conversion efficiency of the entire system obtained in the general parallel optical fiber amplifier of FIG. 1a and the parallel optical fiber amplifier according to the embodiment of the present invention, while varying the length of the EDF portion adapted not to be pumped, respectively; and, FIG. 4b is a graph depicting noise factors measured respectively for the parallel optical fiber amplifiers of FIGS. 1a and 1b.

A DETAILED DESCRIPTION OF THE PREFERRED EMBODIMENT

The following description will be made while comparing a parallel optical fiber amplifier according to an embodiment of the present invention with a conventional optical fiber amplifier in terms of the configuration and performance, for easy identification for effects obtained by the embodiment of the present invention.

In FIG. 1a illustrating the conventional parallel optical fiber amplifier, a C-band silica-based EDFA stage 110 and an L-band silica-based EDFA stage 120 are connected to each other in parallel by C-band/L-band WDM couplers 130 and 132, respectively. The C-band EDFA stage 110 includes a C-band EDF 112 having a predetermined length, and a first laser diode 114 for outputting the pumping light of 980 nm to the C-band EDF 112. The first laser diode 114 is coupled to the C-band EDF 112 via a first WDM coupler 116.

In contrast, the L-band EDFA stage 120 includes two EDFs 122 and 124 connected together in series, and a second laser diode 126 coupled between these EDFs 122 and 124 serves to provide output pumping light of 980 nm to the EDF 124. The second laser diode 126 is coupled to the EDF 124 via a second WDM coupler 128 so that it forwardly pumps only the EDF 124. By virtue of such arrangement of the second layer diode 126, the EDF 122 is not being pumped by the second layer diode 126. The reason that the optical fiber amplifier is configured as mentioned above is not only to obtain gains in wide wavelength bands by using the C-band and L-band EDFA stages 110 and 120, but also to allow the reverse ASE light emitted from the EDF 124 being pumped by the second laser diode 126 to serve as a secondary pumping source in the EDF 122, in order to achieve an enhancement in the power conversion efficiency.

Furthermore, in order to guide the optical signals to travel in one direction in the optical fiber amplifier, a plurality of optical isolators 140, 142, and 144 are arranged at the input terminal of the optical fiber amplifier, the output terminal of the C-band EDFA stage 110, and the output terminal of the L-band EDFA stage 120, respectively.

FIG. 1b is a schematic view illustrating the parallel optical fiber amplifier according to the embodiment of the present invention. In FIG. 1b, all the elements corresponding to those elements in FIG. 1a are denoted by the same reference numerals, and the description of these elements are omitted for simplicity.

Referring to FIG. 1b, the reverse ASE light emerging from a C-band EDFA stage 110 is supplied to the EDF 122, which is not being pumped by a second laser diode 126 via an optical circulator 150, a connecting optical fiber 160, and a C-band/L-band WDM coupler 170. The EDF 122, which is not being pumped by the second laser diode 126, uses both the useless reverse ASE light emitted from the EDF 124 and the useless reverse ASE light emitted from the C-band EDFA stage 110, in order to achieve better power conversion efficiency in accordance with the embodiment of the present invention Although the EDF 122, which is not being pumped by the laser diode 126, has been described as being included in the L-band EDFA stage 120 in the illustrated embodiment of the present invention, the intended effects of the present invention are still obtainable even though the EDF 122 is not provided, which will be apparent from the later description made in conjunction with FIGS. 4a and 4b. That is, the present invention using the reverse ASE from the first EDFA can improve the efficiency of the second EDFA irrespective of the presence of the EDF 122 as long as the injected reverse ASE from the first EDFA is in the same direction as the laser diode 126 of the second EDFA.

Now, a comparison with the general optical fiber amplifier as known in the conventional method will be made to show the advantages and improvements achieved according to the present invention. For the comparison purposes, EDFs having the same configuration as shown in FIGS. 1a and 1b are used in both cases. A commercially available Al-co doped optical fiber exhibiting a maximum absorption coefficient of 4.5 dB/m at a wavelength of 1,530 nm is used for each EDF. In order to observe a variation in the power conversion efficiency depending on the length of the EDF 122, a measurement was made for the power conversion efficiency under the condition in which the respective lengths of C-band EDF 112 and L-band EDF 124, are fixed at 20 m and 135 m, respectively, and the length of EDF 122 was varied at 0 m, 5 m, 15 m, 20 m, 25 m, and 35 m, respectively.

The first and second laser diodes 114 and 126, which conduct a pumping operation at a wavelength of 980 nm, have the output power of 85 mW. Two external resonating lasers, which are tuned to 1,540 nm and 1,595 nm, respectively, are used along with an optical spectrum analyzer in order to evaluate the respective gains of the optical amplifiers for both cases. Input signals having an intensity of 0 dBm are inputted to each optical fiber amplifier to measure the small signal gain, the noise factor, the intensity of saturated power, and the power conversion efficiency.

Loss resulting from the circulator and loss resulting from the C-band/L-band WDM coupler were 0.6 dB and 0.3 dB, respectively.

FIG. 2 is a graph depicting an optical output spectrum of the general parallel optical fiber amplifier shown in FIG. 1a, except without the presence of the EDF 122, for a saturated input signal of 0 dBm. Referring to FIG. 2, it can be found that the bandwidth of the optical gain resulting from the ASE spectrum is wide, i.e., 80 nm or more. For signals at 1,540 nm and 1,595 nm, the measured intensities of saturated outputs were 14.75 dBm and 10.66 dBm, respectively.

In order to identify the fact that reverse ASE light has enough intensity to provide an improvement in power conversion efficiency, the intensity of the reverse ASE light emitted from each of the C-band EDFA and L-band EDFA was measured using a circulator.

Figure 3:
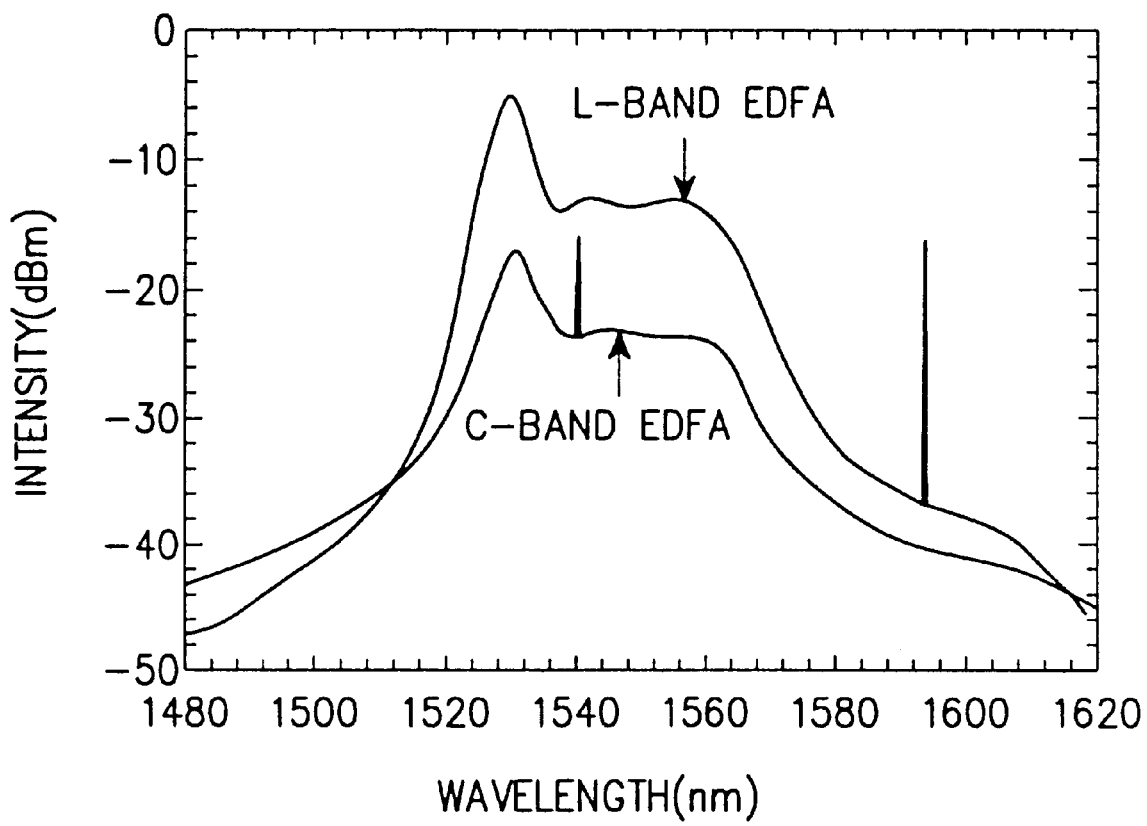
FIG. 3 is a graph depicting reverse ASE spectrums observed for C-band and L-band EDFAs, as illustrated in FIG. 1b, when an input saturated signal of 0 dBm is inputted.

FIG. 3 is a graph depicting reverse ASE spectrums, respectively, observed for the above two EDFAs when an input saturated signal of 0 dBm is inputted, as shown in FIG. 1b. The spectrum measurement was conducted using an optical spectrum analyzer with a resolution of 0.2 nm. Both spectrums exhibited peaks in the vicinity of wavelengths 1,540 nm and 1,595 nm, respectively, as shown in FIG. 3. These peaks may result from a Rayleigh back-scattering of each input signal. The intensity of the reverse ASE light emitted from the C-band EDFA was 1.5 mW. This value is relatively low, as compared with the intensity of the reverse ASE light emitted from the L-band EDFA, which is about 17 mW. However, the reverse ASE intensity of about 1.5 mW may be sufficient to provide an improvement in the L-band amplification efficiency. This insertion is supported by the article issued by A. Mori and entitled "Tellurite-Based EDFA for Wide-Band Communications" in OFC Technical Summery WA1, 1998, page 97. The article discloses the use of signals of 1,550 nm having an intensity lower than 1.5 mW as a pumping source for the L-band amplification.

FIG. 4a depicts the measurement results of the 1,595 nm saturated signal output intensity, along with the 1.540 nm saturated signal output intensity, and the power conversion efficiency of the entire system obtained in the general parallel optical fiber amplifier as shown in FIG. 1a (hereinafter, referred to as a "first type parallel configuration") and the parallel optical fiber amplifier according to the embodiment of the present invention as shown in FIG. 1b (hereinafter, referred to as a "second type parallel configuration"), while varying the length of the EDF portion (122).

Referring to FIG. 4a, it can be found that the output intensity in the first type parallel configuration exhibits high dependency on the length of the EDF portion(122), which is not being pumped, in such a fashion that it increases as the length of the EDF portion (122) increases. In the first type parallel configuration, an improvement in the overall pumping efficiency ranges from 24.4% to 31.3%. This improvement results from the fact that the useless reverse ASE light emitted from the EDF portion (124) being pumped in the L-band EDFA stage is re-used in the EDF portion (122), which is not being pumped. However, at a higher 1,595 nm saturated signal output intensity, higher power conversion efficiency was observed in the second type parallel configuration compared to the first type parallel configuration, as illustrated in FIG. 4a.

Moreover, when the EDF portion (122) was not provided, the 1,595 mn saturated signal output intensity was still enhanced to 16.8 mW in the second type parallel configuration, where the first type parallel configuration only exhibited 11.6 mW under the same condition. This improvement was still achievable since the reverse ASE light emitted from the C-band EDFA stage is served as a secondary light pumping source for amplifying signal in the L-band EDFA stage.

As stated above, the second type parallel configuration exhibits superior results over the first type parallel configuration because the reverse ASE light emitted from the C-band EDFA stage is also re-used in the second type parallel configuration, even though its intensity is low compared to the reverse ASE light emitted from the C-band EDFA stage in the first type parallel configuration.

It is noted that in FIG. 4a the increasing effect of the power conversion efficiency obtained by reusing the reverse ASE light emitted from the C-band EDFA stage decreases gradually as the length of the EDF portion(122) increases. This phenomenon results from the fact that the intensity of the reverse ASE light emitted from the C-band EDFA is lower than that the L-band EDFA.

On the basis of the above mentioned results, it is possible to design a parallel optical fiber amplifier configuration capable of achieving the most efficient use of pump intensity. In accordance with the present invention, therefore, the EDF portion 122 is arranged upstream from the pumping laser diode in such a fashion that it reuses the intensity of the reverse ASE light resulting from the pumping operation of the pumping laser diode in the L-band EDFA stage as well as in C-band EDFA stage.

In order to measure the change in the noise factor resulting from the low and limited intensity of the reverse ASE light emitted from the C-band EDFA stage, respective noise factors of the first and second type parallel configurations were measured. The measured results are depicted in FIG. 4b. Referring to FIG. 4b, it can be found that the second type parallel configuration exhibits an internal noise factor lower than that of the first type parallel configuration by about 0.3 dB. This low noise factor of the second type parallel configuration results from the fact that the reverse ASE light emitted from the C-band EDFA stage not only serves as a pumping source for amplifying the signal of 1,600 nm in the L-band EDFA stage, but also serves as photon seeds at a down stream amplifying stage at a wavelength of 1,600 nm. It was also observed, for both type parallel configurations, that an increase in the noise factor occurs as the length of the EDF portion (122) increases. This results from a decrease in the average population inversion occurring due to a decrease in the intensity of the ASE light per length in the EDF portion (122), which is not being pumped.

As apparent from the above description, the present invention applies the technique for reusing the useless reverse ASE light to a parallel optical fiber amplifier having different gain bands—C-band and L-band—thereby allowing the parallel optical fiber amplifier to operate in a very wide wavelength band while exhibiting high power conversion efficiency. After testing the performance of the optical fiber amplifier according to the present invention, it is found that when a pumping operation is conducted using light having a wavelength of 980 nm, a remarkable increase in the power conversion efficiency of the entire system is exhibited. Moreover, a better performance in terms of the noise factor was also exhibited. Thus, an optical fiber amplifier having a greatly improved performance can be provided in accordance with the present invention.

While there have been illustrated and described what are considered to be the preferred embodiments of the present invention, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A parallel optical fiber amplifier comprising:
   a first erbium-doped fiber amplifier EDFA) stage;
   a second EDFA stage coupled to said EDFA stage in parallel, said second EDFA stage having a gain wavelength band different from said first EDFA stage; and,
   means for reusing spontaneous emission light emitted from said first EDFA stage as a secondary pumping source in said second EDFA stage.

2. The parallel optical fiber amplifier in accordance with claim 1, wherein said first EDFA stage comprises a C-band EDFA, and said second EDFA stage comprises an L-band EDFA.

3. The parallel optical fiber amplifier in accordance with claim 1, wherein said reusing means comprises:
   a circulator for receiving the spontaneous emission light from said first EDFA stage;
   a connecting means for transmitting the received spontaneous emission light from said first EDFA stage to said second EDFA stage; and,
   a wavelength selective optical coupler connected between said connecting means and said second EDFA stage for guiding the spontaneous emission light from said connecting means to be transmitted to said second EDFA stage.

4. The parallel optical fiber amplifier in accordance with claim 1, wherein said second EDFA stage comprises:
   a first optical pumping means for pumping light source;
   a first optical fiber portion being optically pumped by said first optical pumping means; and,
   a second optical fiber portion not being pumped by said first optical pumping means coupled to said means for reusing the spontaneous emission light from said first optical fiber portion, wherein said first optical pumping is disposed between said first optical fiber portion and said second optical fiber portion for providing the pumping light source in a forward direction to said first optical fiber portion.

5. The parallel optical fiber amplifier in accordance with claim 1, wherein said first EDFA stage comprises a second optical pumping means for pumping light source thereof.

6. The parallel optical fiber amplifier in accordance with claim 1, wherein each of said first EDFA stage and said second EDFA stage is comprised of a silica-based optical fiber.

7. The parallel optical fiber amplifier in accordance with claim 2, wherein each of said first EDFA stage and said second EDFA stage is comprised of a silica-based optical fiber.

8. The parallel optical fiber amplifier in accordance with claim 3, wherein each of said first EDFA stage and said second EDFA stage is comprised of a silica-based optical fiber.

9. The parallel optical fiber amplifier in accordance with claim 4, wherein each of said first EDFA stage and said second EDFA stage is comprised of a silica-based optical fiber.

10. A parallel optical fiber amplifier comprising:
a first erbium-doped fiber amplifier (EDFA) stage;
a second EDFA stage coupled to said EDFA stage in parallel, said second EDFA stage having a gain wavelength band different from said first EDFA stage;
said second EDFA stage includes a first optical pumping means for a pumping light source, a first optical fiber portion being optically pumped by said first optical pumping means, and a second optical fiber portion not being pumped by said first optical pumping means coupled to said means for reusing the spontaneous emission light from said first optical fiber portion, wherein said first optical pumping is disposed between said first optical fiber portion and said second optical fiber portion for providing the pumping light source in a forward direction to said first optical fiber portion; and,
means for reusing spontaneous emission light emitted from said first EDFA stage as a secondary pumping source in said second EDFA stage.

11. The parallel optical fiber amplifier in accordance with claim 10, wherein said first EDFA stage comprises a C-band EDFA, and said second EDFA stage comprises an L-band EDFA.

12. The parallel optical fiber amplifier in accordance with claim 10, wherein said reusing means comprises:

a circulator for receiving the spontaneous emission light from said first EDFA stage;

a connecting means for transmitting the received spontaneous emission light from said first EDFA stage to said second EDFA stage; and, an optical coupler connected between said connecting means and said second EDFA stage for guiding the spontaneous emission light from said connecting means to be transmitted to said second EDFA stage.

13. The parallel optical fiber amplifier in accordance with claim 10, wherein said first EDFA stage comprises a second optical pumping means for pumping light source thereof.

14. The parallel optical fiber amplifier in accordance with claim 10, wherein each of said first EDFA stage and said second EDFA stage is comprised of a silica-based optical fiber.

15. The parallel optical fiber amplifier in accordance with claim 11, wherein each of said first EDFA stage and said second EDFA stage is comprised of a silica-based optical fiber.

16. The parallel optical fiber amplifier in accordance with claim 12, wherein each of said first EDFA stage and said second EDFA stage is comprised of a silica-based optical fiber.

17. A method for amplifying an optical signal comprising the steps of:

providing a pumping light source to a first erbium-doped fiber amplifier (EDFA) and a second erbium-doped fiber amplifier (EDFA) using optical pumping means;

generating amplified spontaneous emission light in said first EDFA and said second EDFA in the opposite direction to said pumping light;

supplying said amplified spontaneous emission light from said first EDFA to said second EDFA via a connecting means; and, using said supplied amplified spontaneous emission light from said first EDFA and the amplified spontaneous emission light from said second EDFA as a pumping source in said second EDFA.

18. The method as set forth in claim 17, wherein said method further comprising the step of providing an output signal light from an output of said optical fiber amplifier.

* * * * *